(12) United States Patent
Rust et al.

(10) Patent No.: US 6,953,105 B2
(45) Date of Patent: Oct. 11, 2005

(54) DAMPING FOIL CONSISTING OF SEVERAL LAYERS AND A METHOD FOR PRODUCING SAME

(75) Inventors: Torsten Rust, Garbsen (DE); Ehrenfried Blümel, Adelheidsdorf (DE)

(73) Assignee: Stankiewicz GmbH, Adelheidsdorf (DE)

( * ) Notice: Subject to any disclaimer, the term of this patent is extended or adjusted under 35 U.S.C. 154(b) by 55 days.

(21) Appl. No.: 10/182,345

(22) PCT Filed: Jan. 17, 2001

(86) PCT No.: PCT/EP01/00499

§ 371 (c)(1),
(2), (4) Date: Nov. 25, 2002

(87) PCT Pub. No.: WO01/54897

PCT Pub. Date: Aug. 2, 2001

(65) Prior Publication Data

US 2003/0132057 A1 Jul. 17, 2003

(30) Foreign Application Priority Data

Jan. 28, 2000 (DE) .......................................... 100 03 810

(51) Int. Cl.[7] .............................. E04B 1/82; E04B 1/84; B32B 15/12; B32B 15/18
(52) U.S. Cl. ........................ 181/293; 181/294; 181/290; 181/286; 428/343
(58) Field of Search ................................. 181/293–296, 181/290, 286; 428/332, 340, 343; 52/144, 145

(56) References Cited

U.S. PATENT DOCUMENTS

| | | | | |
|---|---|---|---|---|
| 3,770,560 A | * | 11/1973 | Elder et al. ................. 181/286 |
| 4,150,186 A | * | 4/1979 | Kazama ....................... 428/140 |
| 4,287,263 A | * | 9/1981 | Woodring et al. ........... 181/290 |
| 4,347,912 A | * | 9/1982 | Flocke et al. ................ 181/286 |
| 4,734,323 A | * | 3/1988 | Sato et al. ................... 181/294 |
| 4,735,284 A | * | 4/1988 | Gahlau et al. ............... 181/290 |
| 4,833,018 A | * | 5/1989 | Ruehl et al. ................. 428/332 |
| 5,022,943 A | * | 6/1991 | Zaima .......................... 52/144 |
| 5,030,501 A | * | 7/1991 | Colvin et al. ................ 428/178 |
| 5,103,614 A | * | 4/1992 | Kawaguchi et al. .......... 52/392 |
| 5,258,585 A | * | 11/1993 | Juriga .......................... 181/286 |
| 5,744,763 A | * | 4/1998 | Iwasa et al. ................. 181/286 |

FOREIGN PATENT DOCUMENTS

| | | |
|---|---|---|
| DE | 34 27 916 A1 | 1/1986 |
| DE | 35 10 932 A1 | 10/1986 |
| DE | 38 25 494 A1 | 2/1990 |
| EP | 195 923 B1 | 10/1986 |
| EP | 285 740 B1 | 10/1988 |
| EP | 673 763 A1 | 9/1995 |
| GB | 1481163 | 7/1977 |
| JP | 03269598 A * | 12/1991 ........... G10K/11/16 |

OTHER PUBLICATIONS

International Preliminary Examination Report in PCT/EP01/00499 dated Apr. 25, 2002.

* cited by examiner

*Primary Examiner*—Edgardo San Martin
(74) *Attorney, Agent, or Firm*—Marshall, Gerstein & Borun LLP

(57) ABSTRACT

A multi-layer damping foil having a perforated lower layer facing towards a part to be damped, with properties which are suitable for adhering the damping foil onto the part. A non-perforated upper layer, facing away from the part, does not have adherence properties. Advantageously there may be provided between the upper and lower layers a thin film-like intermediate layer of non-woven fabric, kraft paper, or the like, which may have openings.

27 Claims, 3 Drawing Sheets

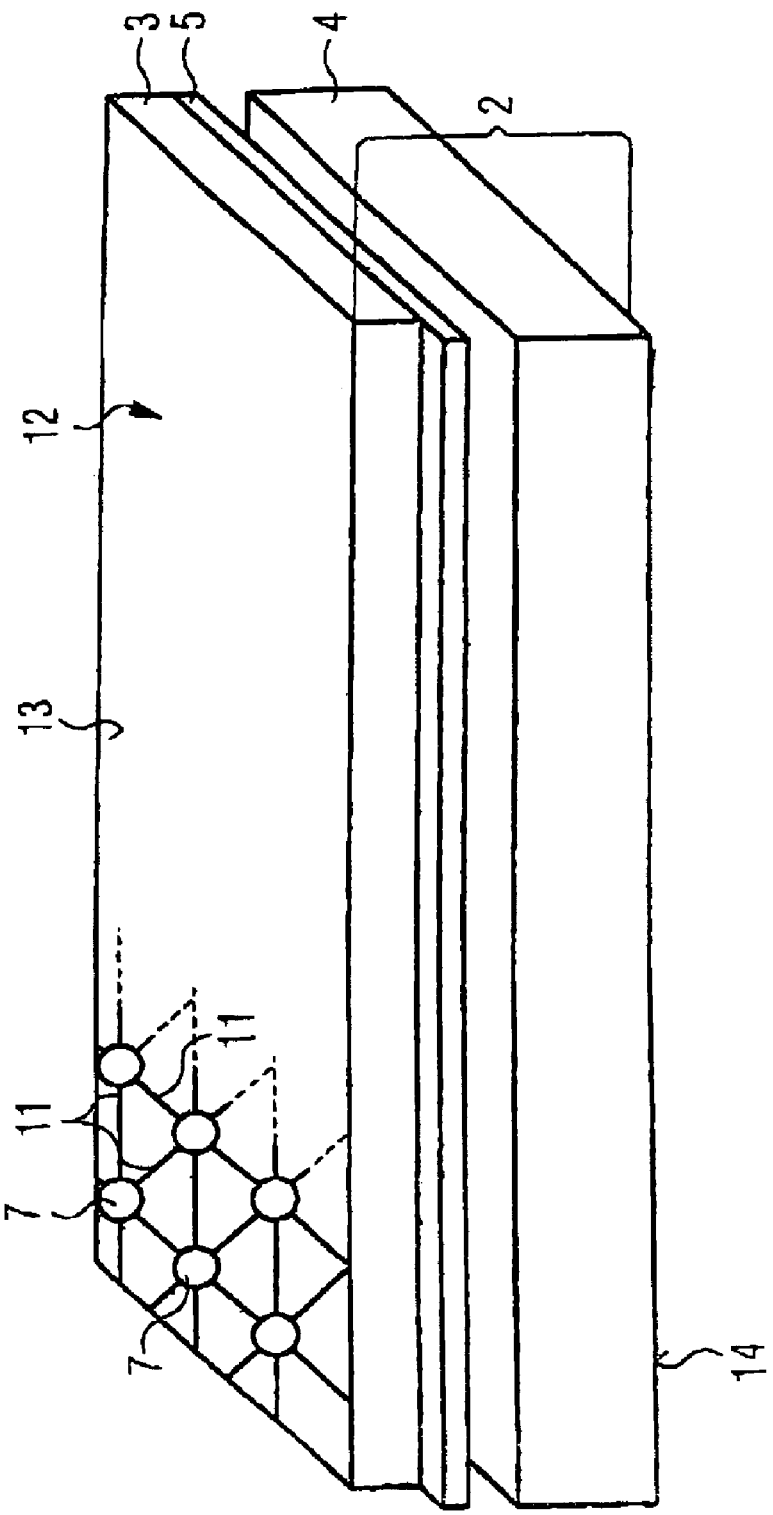

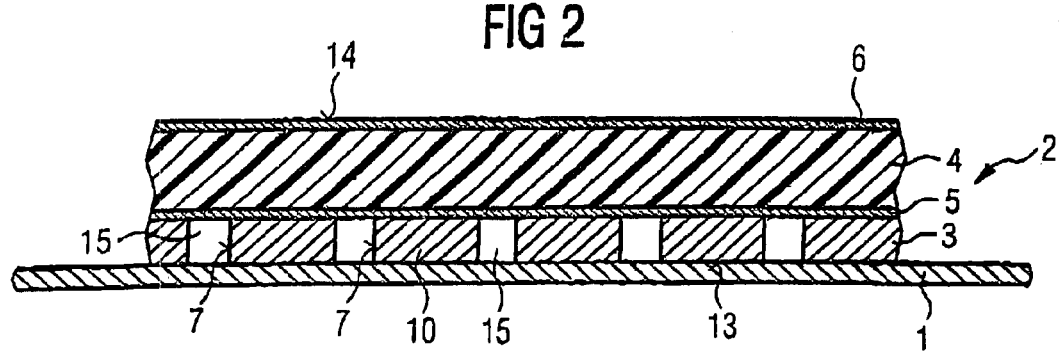
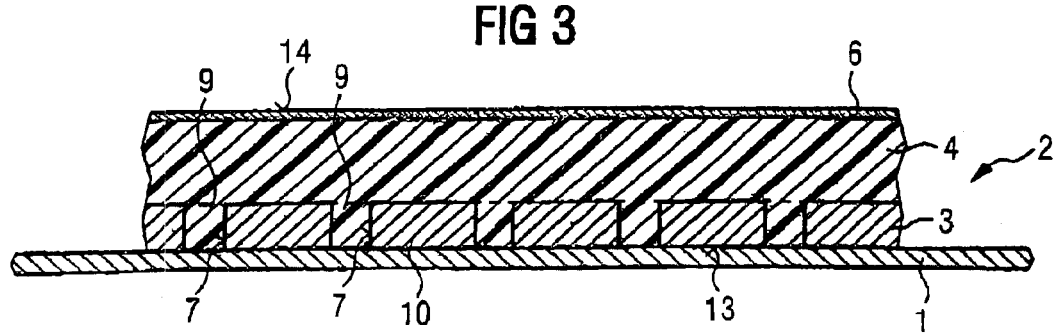
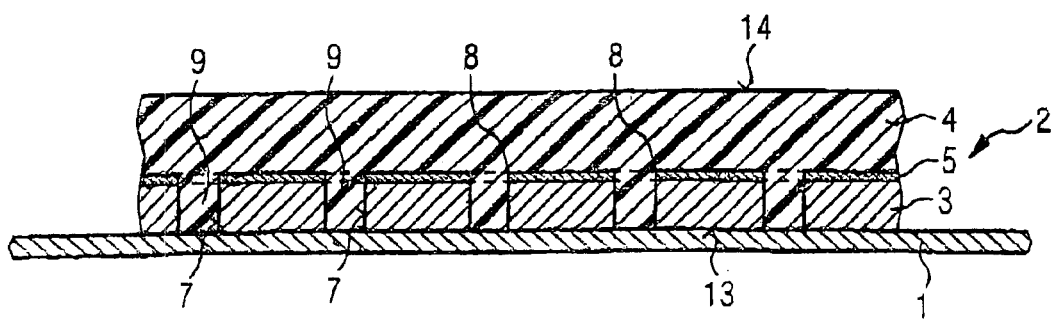

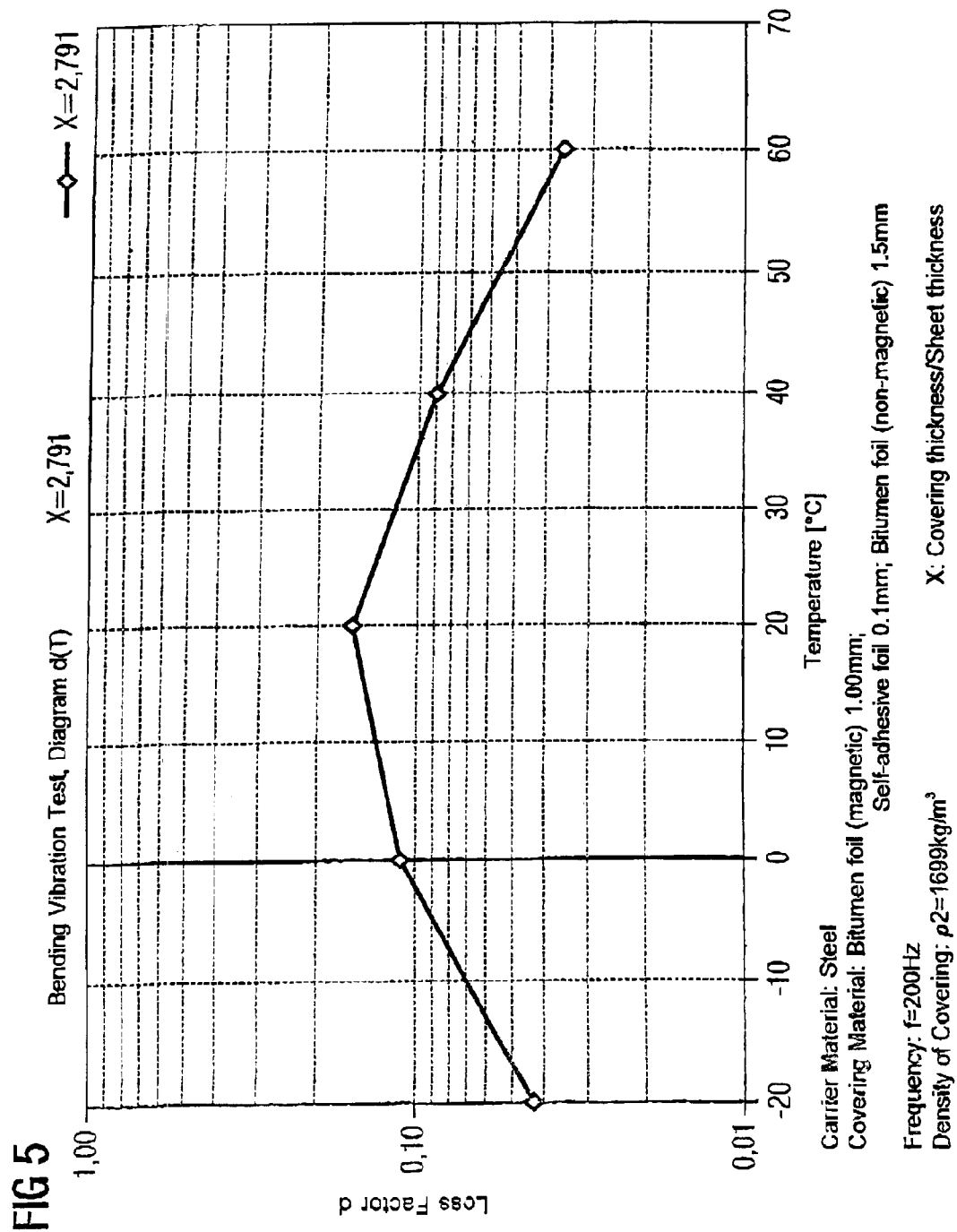

DAMPING FOIL CONSISTING OF SEVERAL LAYERS AND A METHOD FOR PRODUCING SAME

This is the U.S. national phase of International Application No. PCT/EP01/00499 filed Jan. 17, 2001, the entire disclosure of which is incorporated herein by reference.

BACKGROUND OF THE INVENTION

1. Field of the Invention

The invention relates to a multi-layer damping foil or anti-drumming foil.

2. Description of Related Technology

Damping foils or anti-drumming foils are employed, in particular in the automobile industry, for the sound deadening, i.e. sound damping, of sheets or panels. In particular, such damping foils can be placed in the interior roof and side regions of a body and there adhere firmly all over the surface. Frequently, such damping foils are painted over. The all-over surface adherence is attained, in accordance with the state of the art, in that the side of the damping foil towards the sheet or panel to be damped is provided with a hot-melt glue and after application of the damping foil onto the sheet to be damped a heat treatment is carried out which brings about the melting of the hot-melt glue and therewith attains the all-over surface gluing. In order to be able to hold the damping foil in position before the heat treatment, in particular in the case of roof and side regions of a body, in accordance with the state of the art such a damping foil is constituted to be magnetisable. For this purpose, previously, rod or strip-shaped metal parts have been set into the side of the damping foil towards the sheet to be damped (DE 38 25 494 A1) or there are mixed into the damping foil, in its production, ferrite powder or similar magnetic or magnetisable powdery particles (DE 34 27 916 A1). Damping foils constituted in this way adhere during the heat treatment to the body sheeting due to their own magnetic properties, or due to permanent magnets arranged on the outer side of the sheeting, which attract the magnetisable particles in the damping foil and therewith the entire damping foil. After it had been determined that it was sufficient to correspondingly constitute only a certain layer thickness, it was proposed to employ a multi-layer structure with which a lower layer, towards the sheet or panel, contains magnetic or magnetisable particles and that a layer away from the sheet or panel, which layer fulfils in substance the damping function, does not need such particles. Between these layers, both in general including bituminous material, there can be embedded, in accordance with the state of the art, a flexible foil of aluminium or polyethylene (EP 0 285 740 B1).

In particular the layer towards the sheet to be damped, having the magnetic or magnetisable particles, has high mass per unit area and thus determines the overall weight of the damping foil to be applied to a very significant degree, without this layer contributing significantly to the damping.

SUMMARY OF THE INVENTION

Starting from here, it is the object of the invention to improve a damping foil as explained above to the effect that without adversely effecting the sound damping behaviour and the readiness of application to the part to be damped, the mass per unit area is reduced.

This object is achieved in accordance with the invention in that the lower layer, towards the part to be damped, such as a body sheet, has numerous through-openings in the sense of being perforated.

Of particular advantage, with regard to acoustic properties, is to provide between the two layers an intermediate layer of non-woven fabric or kraft paper.

With a particular configuration for certain production technologies it is expedient to provide these openings not only in the lower layer but also in the associated intermediate layer, such that the material of the upper layer upon its application can penetrate through the openings. Even if the mass per unit area of the lower layer is thereby slightly increased in comparison with a configuration in which the openings are filled with air, the damping foil can however be produced overall more economically, since the material of the upper layer can be applied to the lower layer, provided with the intermediate layer, in a simple manner and bonds very well with lower layer and intermediate layer.

Alternatively, the lower layer can be formed also as adhesive layer which whilst achieving an adherent connection is removable intact, as is per se known from DE 35 10 932 A1 or EP 0 195 923 B1.

In the production of a damping foil in accordance with the invention, on a web or sheet material forming the lower layer, after perforation thereof, a web or sheet material forming the upper layer is laminated on or applied in some other manner. If an intermediate layer is provided this is to be laminated onto the lower layer before or after the perforation of that layer. For example, the non-woven fabric or the kraft paper which forms intermediate layer may be constituted to be adhesive on both sides.

BRIEF DESCRIPTION OF THE DRAWINGS

The invention will now be described in more detail with reference to the exemplary embodiments illustrated in the drawings. There is shown:

FIG. 1 in an exploded and perspective illustration, a section of a damping foil in accordance with the invention viewed towards the side facing the part to be damped, FIG. 2 in section, a damping foil, laid on a sheet to be damped, in accordance with a first exemplary embodiment, FIG. 3 in section, a damping foil, laid on a sheet to be damped, in accordance with a second exemplary embodiment, FIG. 4 in section, a damping foil, laid on a sheet to be damped, in accordance with a further exemplary embodiment, FIG. 5 the temperature dependence of the loss factor, determined in accordance with a bending vibration test, of an exemplary embodiment of damping foil in accordance with FIG. 2.

DETAILED DESCRIPTION

FIG. 1 shows in perspective and in exploded illustration a damping foil 2 viewed towards the side 13, facing the part to be damped, of a "lower" layer 3, facing the part to be damped, of the damping foil 2. The damping foil 2 further has "upper" layer 4, facing away from the part to be damped, and a film-like intermediate layer 5, formed by means of non-woven fabric or by means of kraft paper, between the layers 3 and 4 of the damping foil 2. On the side 13 facing the part to be damped there may be applied an adhesive such as a hot-melt glue 12 or a dispersion glue. The lower layer 3 of the damping foil 2 is formed, at least in the region of this side 13, as an element attaining at least a temporary adherent connection with the part to be damped. In accordance with a first exemplary embodiment there are embedded in the material of the lower layer 3 magnetised or magnetisable particles (for example following DIN 17470 and DIN 50470), in the following briefly referred to as ferrite powder.

For weight reduction this lower layer 3 has openings 7, of which a few are iIllustrated. These openings are expediently formed for simple production in the manner of perforations penetrating through the entire lower layer 3. Further, impressions 11 are advantageously provided in the side 13 of the lower layer 3, which are so arranged that they connect the openings 7. They serve, in the heat treatment for activating the hot-melt glue 12, to prevent that air inclusions remain between the part to be damped and the side 13 of the layer 3. The surface pattern of the impressions 11 is thereby not restricted to the pattern illustrated in FIG. 1. A significant factor is that the impressions 11 are provided for each of the openings 7, The void proportion of the openings 7 amounts expediently to about 5 to 30% of the lower layer 3. Expediently, the lower layer 3 has a thickness of from 0.2 to 1.2 mm, preferably from 0.5 to 1 mm and is of a bitumen or a bitumen mixture with a ferrite powder component amounting to about 50 to 70 weight percent. The upper layer 4 of the damping foil, containing no such magnetic or magnetisable particles, and away from the part to be damped, is about 0.8 to 2 mm thick and is expediently likewise of bitumen or a bitumen mixture. This upper layer 4 is fixedly bonded with the lower layer 3 having the openings 7, for example by means of gluing or lamination. For reasons of acoustics it is of significant advantage to provide between these two layers 3 and 4 a thin intermediate layer 5 of nonwoven fabric or kraft paper. The thickness of this intermediate layer 5 is of the order of 0.1 mm. It may be laminated or glued onto the lower layer 3, onto which in turn the upper layer 4 is laminated or glued. Of advantage is an intermediate layer 5 constituted to be adhesive on both sides. As explained below with reference to FIG. 2 and FIG. 4, the intermediate layer 5 may be continuous (FIG. 2) or may likewise have openings 8 (FIG. 4).

The side 14 of the upper layer 4 of the damping foil 2 away from the part to be damped is the so-called "sight side", which in many applications, in particular in the damping of body panels, is painted over. It may thus expediently have a further cover layer 6 (FIG. 2 and FIG. 3), which stabilises the long-term behaviour of this sight side 14. The cover layer 6 can be formed by a per se known antiblocking coating, for avoiding blocking during transportation or storage, or can also be formed by a dispersion coating in order to reduce the externally visible effect oyellowing in the case of light coloured paints. This cover layer 6 is, however, not necessary if there is no reason to fear a risk of blocking or a risk of yellowing.

FIG. 2 shows the application of the damping foil 2 onto a part to be damped, in particular a sheet 1. With the exemplary embodiment in accordance with FIG. 2 there is provided an intermediate layer 5 which is not perforated. By these means it is prevented that material of the upper layer 4 can enter into the openings 7, which could arise under the effect of heat, this sinking then possibly being visible in the sight side 14 directed outwardly. This exemplary embodiment is then of particular advantage if the two layers 3 and 4 are to be produced as web or sheet material and then laminated onto one another.

Another manner of production is however conceivable, namely that with the layer 3, produced as web or sheet material with openings 7 provided therein, the material forming the layer 4 is directly applied such that it can penetrate complete or partly into the openings 7, which is illustrated by means of the stopple-like penetrations 9. By these means an extremely good, firm connection between the two layers 3 and 4 is ensured. This is illustrated in more detail in FIG. 3. In order to be able, to attain the generally desired high loss factor, here also it is expedient to provide an intermediate layer 5. In order likewise to be able to attain penetrations, it is expedient also to provide the intermediate layer 5 with corresponding openings 8, which align with the openings 7 in the lower layer 3. It is however in no sense urgently required that all openings 7 in the lower layer 3 align with the respective associated openings 8 in the intermediate layer 5. This is necessary merely to the extent that firm connection between lower layer 3 and upper layer 4 is ensured. Thereby it is to be taken into consideration that the penetrations 9 have higher weight than the air inclusions in the openings 7 in the embodiment according to FIG. 2.

In FIG. 2 the ferrite powder particles which bring about the magnetic or magnetisable properties of the upper damping foil 2 are represented by points 10. By ferrite powder particles there should be merely understood inclusions which can attain the desired effect, namely the adhering of the damping foil 2 to the sheet 1 to be damped, at least during the heat treatment after the application of the damping foil 2 onto the sheet 1 for the attainment of the firm connection by means of a hot-melt glue, as is explained above. This adhesion can be effected by means of the magnetic properties of these particles 10 themselves, or by means of the capability to cooperate with permanent magnets provided on the other side of the sheet 1.

This (as a rule only temporary) adhesion can however also be brought about completely or in part by means of per se known so-called adhesive constituting of the lower layer 3. This adhesive constituting, which permits an adherent wide area connection of the damping foil 2 with the sheet 1, whereby however the damping foil 2 can be again removed completely intact, is in particular attained in that the layer on the side 13 towards the sheet 1, or in the section neighbouring thereto, has a layer structure of a strongly deficiently cross-linked polyurethane. With bitumen, in particular blown bitumen, this is attainable by means of the mixing of an atactic propylene in a proportion of atactic polypropylene to bitumen of about 1:3. In the mixing of the material for the lower layer 3 the viscosity in the melt at 180° C. is advantageously about 50,000 mPa.s and more, with a penetration value in accordance with DIN1995 between 15 and 55, preferably 35 and 55.

To make more clear the sound-damping function of the damping foil 2, FIG. 5 shows the result of a bending vibration test, measured in accordance with DIN 53440 at a frequency of 200 Hz.

In accordance with the invention it is also possible that the lower layer 3 is both constituted to be adhesive and also provided with ferrite particles.

With regard to the weight saving that can be achieved it should be noted that conventional single-layer or double-layer damping foils, which attain a loss factor of more than 0.1 at 0° C. to 35 . . . 40° C., have a weight per unit area which is 5 kg/m$^2$ and more. With application of the present inventions these weights per unit area overall can be reduced significantly, to about 4.2 kg/m$^2$ and less.

What is claimed is:

1. A multi-layer damping foil comprising a perforated first layer to face a part to be damped, said first layer having properties suitable for adhering the damping foil onto the part, and a non-perforated second layer to face away from the part, wherein said second layer does not have such adherence properties.

2. The multi-layer damping foil according to claim 1, wherein the first layer has, on a side to face the part, impressions which connect the perforations with one another.

3. The multi-layer damping foil according to claim 1, further comprising a thin, film-like intermediate layer disposed between the first and second layers.

4. The multi-layer damping foil according to claim 3, wherein the intermediate layer has openings which align with the perforations in the first layer.

5. The multi-layer damping foil according to claim 3, wherein the intermediate layer is a non-woven fabric layer or kraft paper layer.

6. The multi-layer damping foil according to claim 3, wherein the intermediate layer is provided on both sides with a glue layer, for connection with the first and second layers.

7. The multi-layer damping foil according to claim 1, wherein the first layer has a void proportion of about 5 percent to about 30 percent.

8. The multi-layer damping foil according to claim 1, wherein the first layer contains magnetic or magnetizable particles.

9. The multi-layer damping foil according to claim 8, wherein the particles are present in a proportion of about 50 weight percent to about 70 weight percent.

10. The multi-layer damping foil according to claim 1, further comprising a dispersion glue layer or a hot-melt glue layer on a side facing the part.

11. The multi-layer damping foil according to claim 1, further comprising a dispersion coating, an antiblocking coating or another surface covering layer on a side facing away from the part.

12. The multi-layer damping foil according to claim 1, wherein at least one of the first and second layers comprises a bituminous material.

13. The multi-layer damping foil according to claim 1, wherein the first layer has a thickness of about 0.3 mm to about 1.2 mm, and the second layer has a thickness of about 0.8 mm to about 2 mm.

14. The multi-layer damping foil according to claim 1, wherein the damping foil is so dimensioned that a loss factor thereof is more than 0.1 at 0° C. to 40° C., and the mass per unit area is less than 5 kg/m$^2$.

15. The multi-layer damping foil according to claim 1, wherein at least a portion of the first layer has a layer structure of a strongly deficiently cross-linked polyurethane.

16. The multi-layer damping foil according to claim 15, wherein the first layer is a bituminous mixture.

17. The multi-layer damping foil according to claim 16, wherein the mixture has a melt viscosity at 180° C. of at least about 50000 mPa·s and a penetration value according to DIN 1995 between 15 and 55.

18. A method for producing a multi-layer damping foil comprising a perforated first layer to face a part to be damped, said first layer having properties suitable for adhering the damping foil onto the part, and a non-perforated second layer to face away from the part, wherein said second layer does not have such adherence properties, the method comprising the steps of:

producing a first layer, perforating the first layer to form openings through the first layer, and applying a further, second layer onto the first layer.

19. The method according to claim 18, comprising applying, before or after the perforating step, a thin, flexible intermediate layer onto the first layer.

20. The method according to claim 18, comprising embossing depressions into the first layer on a side thereof away from the second layer after the application thereof, such that these depressions connect the openings with one another.

21. The multi-lever damping foil according to claim 13, further comprising a film-like intermediate layer disposed between the first and second layers, the intermediate layer having a thickness of about 0.1 mm.

22. The multi-lever damping foil according to claim 14, wherein the mass per unit area is less than about 4.2 kg/m$^2$.

23. The multi-layer damping foil according to claim 16, wherein the first layer is a mixture of blown bitumen and atactic polypropylene.

24. The multi-layer damping foil according to claim 23, wherein atactic polypropylene and blown bitumen are present in the mixture in a ratio of atactic polypropylene to bitumen of about 1:3.

25. The multi-layer damping foil according to claim 17, wherein said penetration value is between 35 and 55.

26. The method according to claim 18, comprising laminating the second layer onto the first layer.

27. The method according to claim 19, comprising laminating the intermediate layer onto the first layer.

* * * * *